(12) United States Patent
Beier et al.

(10) Patent No.: US 10,929,400 B2
(45) Date of Patent: Feb. 23, 2021

(54) SELF-OPTIMIZING VALUE RANGE SYNOPSIS IN ANALYTICAL DATABASES

(71) Applicant: International Business Machines Corporation, Armonk, NY (US)

(72) Inventors: Felix O. Beier, Holzgerlingen (DE); Andreas Brodt, Gerlingen (DE); Namik Hrle, Boeblingen (DE); Oliver Schiller, Dettingen/Teck (DE)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 15/335,082

(22) Filed: Oct. 26, 2016

(65) Prior Publication Data

US 2018/0113900 A1    Apr. 26, 2018

(51) Int. Cl.
| | | |
|---|---|---|
| G06F 16/00 | (2019.01) | |
| G06F 16/2455 | (2019.01) | |
| G06F 16/23 | (2019.01) | |

(52) U.S. Cl.
CPC .... *G06F 16/24553* (2019.01); *G06F 16/2308* (2019.01)

(58) Field of Classification Search
CPC ......... G06F 17/30377; G06F 17/30477; G06F 16/951; G06F 16/248; G06F 16/27; G06F 16/24522; G06F 16/2471
See application file for complete search history.

(56) References Cited

U.S. PATENT DOCUMENTS

| | | | | |
|---|---|---|---|---|
| 6,285,997 | B1 * | 9/2001 | Carey | G06F 16/24539 |
| 6,457,020 | B1 * | 9/2002 | Carey | G06F 17/30433 |
| | | | | 707/714 |
| 6,859,455 | B1 | 2/2005 | Yazdani et al. | |
| 8,972,337 | B1 * | 3/2015 | Gupta | G06F 17/30563 |
| | | | | 707/602 |
| 9,372,892 | B1 | 6/2016 | Chainani et al. | |
| 9,576,007 | B1 * | 2/2017 | Sivathanu | G06F 16/282 |
| 9,647,682 | B1 * | 5/2017 | Heng | H03M 7/3088 |
| 2003/0204499 | A1 * | 10/2003 | Shahabi | G06F 16/283 |

(Continued)

OTHER PUBLICATIONS

Google Search (Year: 2013).*

(Continued)

*Primary Examiner* — Mark D Featherstone
*Assistant Examiner* — Kweku William Halm
(74) *Attorney, Agent, or Firm* — Steven Bouknight; Edell, Shapiro & Finnan, LLC

(57) ABSTRACT

A method, a computer program product and a computer system are provided. Attribute value information contains at least a minimum value representing a smallest value of a first attribute and a maximum value representing a largest value of the first attribute, thereby defining a first range of values of the first attribute. A received query against a data table requests one or more values of at least the first attribute that are covered by the first range of values. The attribute value information may be used for selecting a data block of the data table as a candidate potentially including at least part of the requested one or more values and scanning the data block. In response to determining that the data block does not include the one or more requested values, the attribute value information may be updated accordingly.

15 Claims, 5 Drawing Sheets

(56) References Cited

U.S. PATENT DOCUMENTS

| | | | |
|---|---|---|---|
| 2010/0070448 A1* | 3/2010 | Omoigui | H01L 27/1463 706/47 |
| 2010/0131540 A1* | 5/2010 | Xu | G06F 16/24532 707/764 |
| 2014/0095472 A1* | 4/2014 | Lee | G06F 16/24542 707/714 |
| 2014/0095520 A1 | 4/2014 | Ziauddin et al. | |
| 2014/0195542 A1* | 7/2014 | Larson | G06F 16/24554 707/741 |
| 2015/0032763 A1 | 1/2015 | Marwah et al. | |
| 2015/0088812 A1 | 3/2015 | Ziauddin et al. | |
| 2015/0169655 A1* | 6/2015 | Gupta | G06F 16/221 707/602 |
| 2015/0199407 A1 | 7/2015 | Ziauddin et al. | |
| 2015/0234888 A1* | 8/2015 | Ahmed | G06F 16/24535 707/765 |
| 2015/0242506 A1 | 8/2015 | Dickie et al. | |
| 2015/0286682 A1 | 10/2015 | Ziauddin | |
| 2016/0055085 A1* | 2/2016 | Salisbury | G06F 12/0831 711/146 |
| 2016/0098451 A1 | 4/2016 | Dickie | |

OTHER PUBLICATIONS

Yuan et al. "Data Structures for Range Minimum Queries in Multidimensional Arrays" pp. 1-10 (Year: 2010).*

List of IBM Patents or Patent Applications Treated as Related, Jan. 2018, 1 Page.

Bach et al., "Offloading/Smart Scan", Expert Oracle Exadata, Apress, 2011, 42 pages.

"13 Using Zone Maps", Oracle, retrieved from Internet Mar. 2, 2016, http://docs.oracle.com/database/121/DWHSG/zone_maps.htm#DWHSG9355, 25 pages.

Bloom, Burton H., "Space/Time Trade-offs in Hash Coding with Allowable Errors", Communications of the ACM, vol. 13, No. 7, Jul. 1970, pp. 422-426.

Lersch Lucas, "Filtering and Indexing in a Partially-sorted Log Archive", University of Kaiserslautern, Germany, Jun. 2015, retrieved from Internet Oct. 26, 2016, http://wwwlgis.informatik.uni-kl.de/cms/fileadmin/publications/2015/Lersch_GuidedResearch_V4.pdf, 12 pages.

"Google Search (Year: 2001)", dated Apr. 10, 2020, 2 pages.

Fu et al., "Node Splitting Algorithms in Tree-Structured High-Dimensional Indexes for Similarity Search", Proceedings of the 2002 ACM symposium on Applied computing, 2002, 7 pages.

* cited by examiner

SELF-OPTIMIZING VALUE RANGE SYNOPSIS IN ANALYTICAL DATABASES

BACKGROUND

The present invention relates to the field of digital computer systems, and more specifically, to a method for updating attribute value information of data blocks of a data table.

Analytical database systems manage very large amounts of data and are optimized for queries that must read large fractions of the data. At the same time, the analytical database systems offer a complete querying power of SQL. Because such systems do not focus on online transaction processing (OLTP) load, the systems typically do not index each data row, but do rely heavily on scan performance. Nevertheless, to speed up scan performance, the analytical database systems often store information on data blocks.

SUMMARY

Various embodiments provide a method for updating attribute value information of data blocks of a data table, a computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for updating attribute value information of at least one data block of a data table. The data table has multiple records and involves at least a first attribute. Attribute value information includes at least a minimum value representing a smallest value of the first attribute and a maximum value representing a largest value of the first attribute, thereby defining a first range of values of the first attribute. The method includes: receiving a query against the data table requesting one or more values of at least the first attribute that are covered by the first range of values; using the attribute value information for selecting the data block as a candidate potentially including at least part of the requested values and scanning the data block; in response to determining that the data block does not have the requested values (e.g. after scanning the data block), updating the attribute value information accordingly.

In another aspect, the invention relates to a computer program product including a computer-readable storage medium having computer-readable program code embodied therewith. When the computer-readable program code is executed by at least one processing system, the at least one processing system is configured to: receive a query against a data table including multiple records and involving at least a first attribute, attribute value information including at least a minimum value representing a smallest value of the first attribute and a maximum value of the first attribute representing a largest value of the first attribute, thereby defining a first range of values of the first attribute. The received query requests one or more values of at least the first attribute that are covered by the first range of values; uses the attribute value information for selecting a data block of the data table as a candidate potentially comprising at least part of the requested one or more values and scanning the data block; and in response to determining that the data block does not have the requested one or more values, updates the attribute value information accordingly.

In another aspect, the invention relates to a computer system for updating attribute value information of at least one data block of a data table, where the data table has multiple records and involves at least a first attribute. The attribute value information contains at least a minimum value representing a smallest value of the first attribute and a maximum value representing a largest value of the first attribute, thereby defining a first range of values of the first attribute. The computer system is configured for: receiving a query against the data table requesting one or more values of at least the first attribute that are covered by the first range of values; using the attribute value information for selecting the data block as candidate potentially comprising at least part of the requested values and scanning the data block; and in response to determining that the data block does not have the requested values, updating the attribute value information accordingly.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
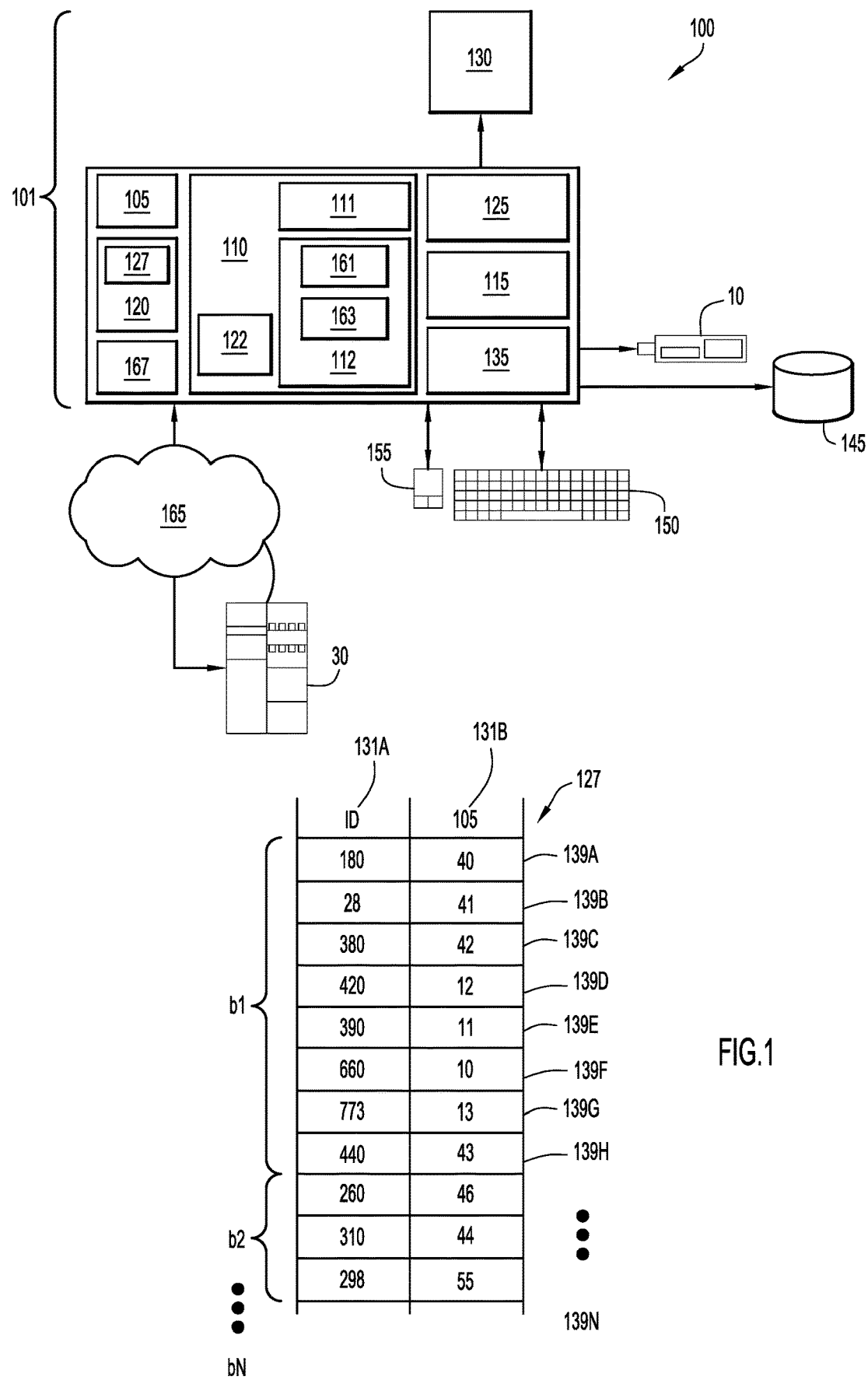
FIG. 1 represents a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Attribute value information may be descriptive of at least a first attribute. Using the attribute value information, a preselection of data blocks of the data table may be performed before scanning the preselected data blocks. The attribute value information may include information or metadata regarding the first attribute that allows such a preselection. For example, a maximum attribute value and a minimum attribute value of the first attribute define a first range of values of the first attribute in a respective first data block. For example, a received data query may request a second range of values of the attribute. The processing of the data query may include selecting data blocks of the data table whose respective first range overlap with the second range and processing those selected data blocks (that forms a scan list).

The attribute value information of a data block may be stored as an entry in a computer system. The attribute value information, and thus an entry, includes a range of values of the first attribute. The range of values is determined by the minimum (min) attribute value and the maximum (max)

attribute value of the first attribute. Thus, in the following the term "entry", "range" and "attribute value information" of a given data block may be interchangeably used.

In order to reduce false positive rates caused by gaps in a value distribution and too conservative min/max values after deletes and updates, the present method may provide two techniques that complement each other:

1. Queries report gaps. Whenever a range or point query scans a data block without actually finding relevant rows, the query reports the data block as a false positive. The report may further indicate a column or an attribute which is a subject of the received query and a query predicate that is not satisfied when scanning the data block (e.g. no rows founds satisfying that query predicate).

2. Several entries per data block. A value-range gap between values a and b may be represented within a data block using two entries e1=[min, a] and e2=[b, max] that refer to same data block, wherein [min, max] is the range of attribute values of the first attribute of the data block that is indicated by the attribute value information and that is stored in the entry e that is split into e1 and e2. A gap (e.g. ]a, b[) or a hole is a range of values of the attribute that are not stored in a data block; and the data block includes attribute values whose range (e.g. [min, max]) fully includes that gap (min<=a; a<b and b<=max).

These two techniques may improve an approximation of the value range in data blocks. When a query reports a false positive for data block z, the computer system may adjust the min/max values of the corresponding entry e. If the query range is entirely contained within [min, max], then the system replaces (splits) e by two new entries e1 and e2. Both e1 and e2 now act as the entries for data block z.

Queries for ranges which overlap any of the value ranges of e1 and e2 may trigger the scan of data block z. But queries for ranges between a and b now do not overlap with any entry e1 and e2 and are thus able to skip data block z (e.g. not scanning data block z). This is particularly the case when the same query that first reported the false positive reoccurs.

For example, the received query may include a statement for selecting rows of data table 127 (FIG. 1) that meet specified criteria. The criteria may be expressed in a form of predicates. The received query may have one or more query predicates on at least attribute 131B. For example, a query predicate may comprise a constant equality predicate (e. g. "AGE=17").

A query predicate may be an element of a search condition that expresses or implies a comparison operation. The query predicate may include a selection expression. The selection expression may be created using an operator. The selection expression may form a so-called relational expression or a condition. The selection expression may consist of a data item or attribute, an operator or negation operator, and a value.

The term "operator" as used herein refers to an operator that tests values or a range of values against an attribute. The operator may for example include a relational operator that tests or defines a relation or condition between two entities including at least the attribute. These include equality (e.g., attribute=5) and inequalities (e.g., attribute≥3).

According to one embodiment, the received query is a range query. Updating of the attribute value information includes excluding the requested values from the first range of values. This may result in one or more second range of values. For example, if the attribute value information of the data block includes a first range [min, max], and the range query is [p, k], then the result of the exclusion is two second ranges namely [min, p) (interval [min, p) means min to p where min is included in the interval and p is not included in the interval) and (k, max] (interval (k, max] means k to max where k is not included in the interval and max is included in the interval). The entry that stores the attribute value information may be split into two entries each containing a respective one of the second ranges. Splitting the entry includes modifying content of the entry to include one of the second ranges and adding a new entry to include an other second range. Thus the data block has two occurrences of attribute value information, each indicating a respective second range and each stored on a respective entry. In another example, a single entry may store multiple ranges of one or more given data blocks.

With queries reporting gaps and introducing several entries (each having a respective second range of the resulting second ranges) per data block, a value distribution within a data block can be approximated more accurately. A term "gap" refers to the requested values that form a gap inside a first range. Moreover, this approach is very cheap, because queries detect gaps, which is what queries do anyway, wherein detecting a gap includes determining that a data block does not have the requested values (that form the gap), e.g. apart from updating the attribute value information itself, no extra work may be required. Most notably, data in the data blocks are left untouched.

According to one embodiment, the received query is a point query. The updating of the attribute value information includes adding to the attribute value information a list comprising the requested value for supporting query processing against the data table using both the attribute value information and the list.

This embodiment may prevent splitting the first range into too many ranges, which may be difficult to manage.

Point queries can be addressed as follows: because the point queries can only identify minimal gaps, the point queries should not cause an entry to be split. To support frequent point queries, this embodiment may augment the attribute value information with a negative list. In addition to extreme values of a particular range in a data block, the attribute value information may include a list of k search values that cause most false positives in the data block. Thus, when a point query searching for value v identifies a data block with a min/max range that includes v, then the query also checks the list to determine whether v is a most frequently failing search value. If this is the case, then the query can skip that data block as the value is known not to be contained in the data block.

A false positive refers to a data block that is (although selected using the attribute value information and) accessed but contains no rows or records matching the query predicate.

According to one embodiment, updating of attribute value information is performed only if a number of second ranges is smaller than a predefined maximum number of ranges.

This embodiment may prevent splitting entries into too many small entries. In particular, point queries for non-existing values are capable of deteriorating the attribute value information by splitting the entries to a point of abuse. On the other hand, even a minimal gap, as, e. g., identified by a point query, is worth representing if the same point is searched often.

To prevent too many small entries of a data block, the predefined maximum number of ranges provide a fixed limit of allowed entries per data block. If the predefined maximum number of ranges has been reached, the updater may not create new entries. All the updater can do is to update the existing entries to more restrictive extreme values.

Further, avoiding frequent splits may reduce a risk of "oscillations" that might occur if the system adapts too quickly and, thereby, spuriously interprets different queries that actually belong to the same workload as a workload shift.

According to one embodiment, the method further includes repeating the step of updating for each additional received query until the number of second ranges reaches a predefined maximum number of ranges. This may increase the accuracy of the attribute value information associated with the data blocks, which may thus increase query performance.

According to one embodiment, the data table further involves a second attribute. The attribute value information further includes a minimum value representing a smallest value of the second attribute and a maximum value representing a largest value of the second attribute. The received query includes a disjunction of two query predicates, the first query predicate requesting values of the first attribute and the second query predicate requesting values of the second attribute, wherein the updating of the attribute value information includes updating both value ranges of the first and second attributes.

The present method may be employed on disjunctions of any primitive predicates listed herein (referring to attribute c and constants a and b). Note that the primitive predicates do not have to be on a same column or attribute:

SELECT*FROM mytable WHERE column1
BETWEEN 50 AND 60 OR column2>1000

If such a query encounters false positives this means that none of the primitive predicates found matching rows. Thus, they can be treated individually, as if they had occurred in separate queries.

For conjunctions, individual primitive predicates may be evaluated independently from each other, false positives identified, and only then, the conjunction over the individual primitive predicates may be computed. In this case, the primitive predicates that did identify false positives can be treated as if they occurred in separate queries.

According to one embodiment, the method further includes: receiving another query against a data table for requesting one or more values of a first attribute that are covered by one or more second ranges of values; creating a scan list for indicating data blocks of the data table to be scanned based on the attribute value information, the scan list being represented by a bit vector wherein each bit of the vector is associated with a respective data block of the data table; for each second range of the second ranges: in response to determining that the bit of the data block is not set, comparing the requested value with the second range and if the requested value is covered by the second range setting the bit; otherwise skipping to a next step of scanning; scanning the data block if the corresponding bit is set.

As there can be several entries per data block, a query range can overlap with several entries pertaining to the data block. In this case the query may read the data block only once i.e., duplicate data blocks may be eliminated from the scan list. One way to implement this is to represent the scan list as a bit vector, with one bit for every data block to scan. Every matching entry sets the bit of the corresponding data block. Matching bits can be set in any case, or alternatively, an entry is only evaluated if the respective bit is not yet set.

A special case is an ability of attribute value information to conclude that all rows in a data block match a query predicate, so that row-by-row evaluation is unnecessary. If several entries per data block are possible then it is no longer enough to find one entry that is completely contained in the query range. By contrast, all entries of a data block may have to lie within the query range to conclude that all rows of the data block qualify.

According to one embodiment, the updating of the attribute value information is performed only if the determining that the data block does not have or does not include the requested values is the nth determining, wherein n is a predetermined number. In other words, the updating is performed using the requested values if the requested values have been requested multiple times and each time they are not found in the data block. This embodiment may be advantageous when a database system frequently changes its content such that content of the data block may frequently change.

According to one embodiment, the determining that the data block does not have the requested values includes: determining that at least one first database transaction involving the data block was started before a second database transaction that triggered the receiving of the query; and waiting until the first database transaction completes before determining that the data block does not have the requested values. This may be advantageous because the first database transaction may change the content of the data block. In another example, the first database transaction may start at a same time as the second database transaction and may thus trigger a query (e.g. query range) on the data block, wherein that requested range of the first database transaction may also not be found in the data block. In this case, this embodiment may be advantageous as it may enable the update of the attribute value information by combining the two ranges.

For example, multiple first database transactions may be determined and may each trigger the generation of a false positive report for the data block. In this example, the waiting may be performed for a predefined maximum time period or may be performed until a predefined number of first transactions are terminated.

This embodiment may solve concurrency issues by deferring the updating of the attribute value information. When updating the attribute value information, the updating may be performed in a way that does not interfere with concurrent transactions.

A following scenario provides an example which assumes multi-version concurrency control (MVCC) on table rows:
1. Transaction A reads table t.
2. Transaction B deletes rows from data block z in t that have values in range r. Then B commits.
3. Transaction C searches for rows in t that lie entirely within the range r. This causes data block z to be reported as a false positive.

Even though transaction C reports data block z as a false positive, the attribute value information updater may not adapt entries for data block z blindly. It could be that transaction A still needs to read the rows that transaction B has deleted. Thus, A still needs the old entry.

Another method may provide a solution to address this by introducing versioned attribute value information, e. g., to employ MVCC on the entries. Thus, older entries are not harmed by newer transactions, i.e., the attribute value information may not have to be maintained in a transaction-consistent way.

The attribute value information may be safely updated when all transactions that are logically before an update/delete transaction that caused a detected gap in the value range are completed. In the above example, transaction B is the update/delete transaction, so that the attribute value information can safely be adjusted as soon as transaction A has terminated.

In another example, a latest write transaction that modified a data block is known (e. g., stored in page headers). Alternatively, transactions can determine a last write transaction from MVCC timestamps, which the transactions can observe. In both cases the transaction number of the last write transaction should be included in the false positive report that is generated. As an alternative, a transaction number of a transaction that reports the false positive may be used as a conservative upper bound. For example, a transaction that caused the hole (i.e. deleted some rows from the data block) must be older than the reader that detected the hole ("fell into it"). Alternatively, the hole may have always existed since the data was first loaded. Also in this case the reader is newer. This would allow transactions that are newer than the reader to detect the hole and potentially skip the data block. Older transactions than the reader (that are still running) would then have to scan the data block in any case. These older transactions will terminate soon. Alternatively, the wait method may wait until all transactions older than the reader are completed before updating the attribute value information.

According to one embodiment, the method further includes, while waiting for a first database transaction to complete: receiving another query (e.g. which may be part of the first database transaction), against a data table, for requesting one or more other values of at least a first attribute that are covered by a first range of values; using attribute value information for selecting a data block of the data table as a candidate potentially including the requested one or more other values and scanning the data block; upon completion of the first database transaction, determining that no record of the data block has the requested one or more values and other values; and updating the attribute value information using the one or more requested values and the other values.

The updater may wait for older transactions to complete before it can process a false positive report. In the meantime, other false positives reports with respect to the same data block may occur. It is possible to combine the two reports, so that only a single attribute value information update is necessary.

The combined update may need to wait for completion of the older transactions of both reports. Meanwhile, new false positive reports for the same data block may occur. To avoid waiting forever, an embodiment of the present method may aggregate either only a fixed maximum number of false positive reports or the embodiment may wait at most for a fixed maximum period of time after an oldest report is processed.

According to one embodiment, the method further includes receiving another query range of values of the first attribute, selecting the data block for further scanning when at least one of the second ranges overlaps with the requested other query range.

According to one embodiment, at least part of the method is executed on a hardware (HW) component of a computer system, e.g., the step of determining that the data block does not have the requested values may be performed by the hardware. Special hardware (e. g., FPGAs) may be used to accelerate query execution. Other than a general-purpose processor, such hardware is capable of executing several computations on current data in parallel, at no extra cost. Making use of such hardware, this embodiment may compute the actual extreme values of every processed data block of the data table as the data is processed—always. This can be done in parallel with actual query processing. When a data block has been fully processed without finding any matching rows, then computed extreme values are included in the false positive report of the query instead of extreme values deduced from query predicates. Thus, using this approach actual values are used to adjust the respective attribute value entries, not the query range. The actual values are of course more accurate. Note that the actual values can be used to adjust the minimum of the smallest entry and the maximum of the largest entry. For example, special hardware could compute, with every scan, actual minimum value and maximum value of a data block. As an example, assume a data block has an actual minimum value and an actual maximum value of 20 . . . 80. Outdated attribute value information still has 1 . . . 100. A FPGA could, while searching (=query) for rows in range 83 . . . 95 determine an actual minimum value and an actual maximum value of 20 . . . 80 at no extra cost. Thus, a hole of a subrange 83 . . . 95 may not be detected, but a single attribute value information entry would be updated to 20 . . . 80. If some holes were previously detected, the current attribute value information entries would specify, e.g., "1 . . . 50, 60 . . . 70, 80 . . . 100". In this case the FPGA would be fed with this set of sub-ranges (each data block may have different attribute value information entries). Then the FPGA could map every scanned value to one of these subranges and thus compute an actual minimum value and an actual maximum value of each subrange. This could result in, e.g., "20 . . . 44, 62 . . . 70, -". In a third subrange, if no values could be found, the values would be removed from the attribute value information. FIG. 1 represents a general computerized system, suited for implementing disclosed method steps.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. a most general system 100 therefore includes a general-purpose computer 101.

In exemplary embodiments, in terms of hardware architecture, as shown in FIG. 1, a computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, a local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly software that is stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software in the memory 110 includes instructions or software 112 e.g. instructions to manage databases such as a database management system.

The database management system 112 may for example include an updater 163 and a query executor 161.

Processing time of a received query may include parsing time spent by a parsing module, optimization time spent by an optimizer module and execution time spent by an execution engine.

The software in memory 110 typically includes a suitable operating system (OS) 111. The OS 111 essentially controls execution of other computer programs, such as possibly software 112 for implementing methods as described herein.

The methods described herein may be in the form of a source program 112, executable program 112 (object code), script, or any other entity comprising a set of instructions 112 to be performed. When using a source program, the source program is translated via a compiler, assembler, interpreter, or the like, which may or may not be included within the memory 110, so as to operate properly in connection with the OS 111. Furthermore, the methods can be written in an object oriented programming language, which has classes of data and methods, or a procedural programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, a microphone, and the like. Finally, the I/O devices 10, 145 may further include devices that communicate both inputs and outputs, including but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via, for example, a broadband connection. The network 165 transmits and receives data between the computer 101 and external systems 30, which may be involved in performing part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in Read-Only-Memory (ROM) so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may include at least one data table (or data set) 127. For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows 139A-N of the data table 127 may include values of the attributes 131A-B. The data table 127 may for example include or may be stored on multiple (e.g. contiguous) data blocks b1-bN.

The term "data block" as used herein may refer to logical or physical storage for storing the data of the data table.

For example, as illustrated in FIG. 1 the data table 127 may be divided, split or assigned to data blocks b1-bN using a number of rows in the data table 127.

In another example, the data table 127 may be split or divided based on storage size such that each data block b1-bN contains or is assigned to one or more storage units e.g. data pages. The term "storage unit" as used herein is intended to refer to a minimum addressable unit (e.g. by software 112) in order to store the data table 127. A size of the storage unit may be an integer multiple of a size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may comprise containers and extents, wherein extents can be defined in term of a number of data pages, while a container can determined in terms of a number of extents.

Rows of each data block, e.g. b1 of the data table 127, may be stored on contiguous, linked, or indexed disk units (e.g. of storage 120) that form corresponding data pages of the data block b1. The term "disk unit" refers to a minimum addressable unit on storage 120. For example, a disk unit may have a size of 512 bytes. The data blocks b1-bN may or may not include a same number of data pages.

The term "data table" or "data set", as used herein, refers to a collection of data that may be presented in tabular form. Each column in the data table may represent a particular variable or attribute. Each row in the data table may represent a given member, record or entry of the data table.

Each data block b1-bN may be associated with attribute value information. For example, the attribute value information may be saved together with the data block to which it is associated (which is an indication that the attribute value information and the data block correspond to each other). In another example, the attribute value information may be stored (e.g. in a table) separately from the associated data block and having pointers/addresses or links to the associated data block.

The computer 101 may further include a false positive report buffer 167 that may include reports on false positives, e.g. of the data table 127. The buffer 167 is shown as separate component of the computer 101 but, in another example, can be part of storage 120 or memory 110.

While FIG. 1 only shows a few attributes and data blocks, it will be appreciated that numerous attributes and/or data blocks may exist or may be used.

Figure 2:
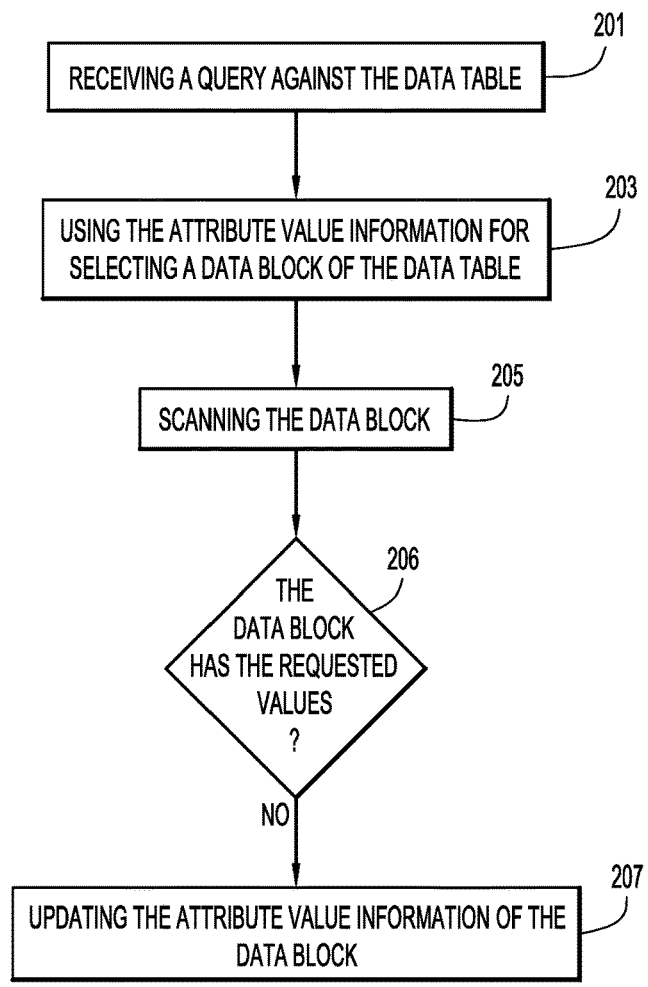
FIG. 2 is a flowchart of a method for updating attribute value information of at least one data block of a data table.
Figure 2:
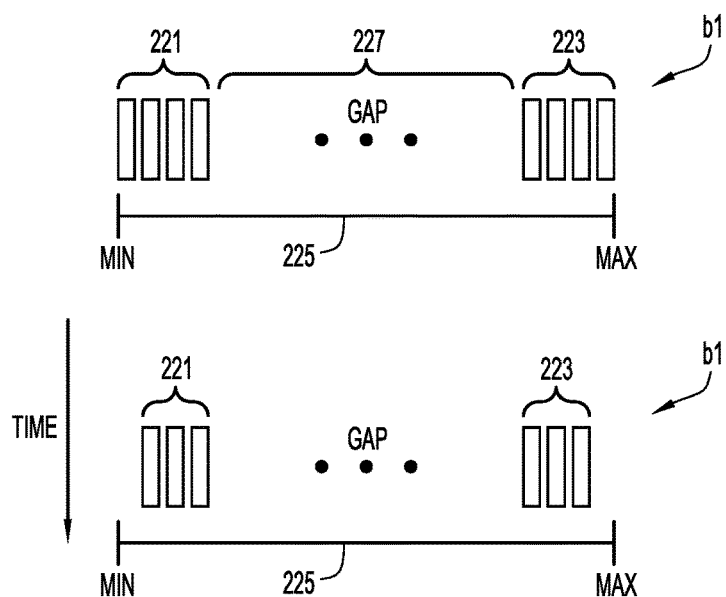

FIG. 2 is a flowchart of a method for updating attribute value information of at least one data block, e.g. b1 of a data table e.g. 127. In this example, data block b1 is used. Data block b1 is illustrated in FIG. 2 as containing values of the attribute 131B, covering a first range 225. Assuming, for example, that the attribute 131B has an integer type value and missing values in data block b1 are 14 to 39. Those missing values are referred to in FIG. 2 as a gap 227. The data block b1 is shown in FIG. 2 as containing records 221 and 223 (in addition to the gap 227). The records 221 include records 139A-C and 139H. The records 223 comprise records 139D-G.

FIG. 2 further illustrates that the data block b1 may change its content over time. This change may induce a change in the gap 227 as the gap 227 may become larger and/or may introduce further gaps in the range [min, max] of data block b1. For example, two records of the records 223 may be deleted and one record from records 221 may be deleted.

In step 201, a query against the data table 127 may be received. The query may request one or more values of the attribute, e.g. 131B, that are covered by the first range of values. A requested value that is covered by the first range 225 may or may not be in the data block b1. For example, a requested value 35 of attribute 131B may be smaller than a maximum value 43 and higher than a minimum value of 10, i.e. covered by the first range [10-43], but may not be included in the data block b1.

The received query may be a point query or a range query.

For example, the received query may use all inclusive and exclusive range predicates comparing a column or attribute c with constants a and b. The received query may also include point queries. Examples of received queries may include:

$(c=a)$ $(c \geq a), (c > a)$ $(c \leq b), (c < b)$ $(c > a \wedge c < b), (c \geq a \wedge c \leq b)$ The received query may include predicates that can be rewritten to one of the above listed predicates, such as c LIKE 'xxx %'.

In step 203, attribute value information may be used for selecting the data block b1 as a candidate that potentially includes at least part of the requested values. Using the example of b1, the attribute value information includes the first range [10-43] of values of the attribute 131B. If the requested values are covered by the first range 225 this may be an indication that the data block b1 may contain the requested values. However if a data block has e.g. a range of [50-70], this data block would not be selected for scanning because the data block does not contain the requested value.

In step 203, other data blocks of the data table 127 (if the data table 127 has more than one data block b1) may be selected for scanning, using their respective attribute value information. What is described in the following for data block b1 may be performed for the other selected data blocks.

In step 205, the data block b1 may be scanned.

In step 207, the attribute value information may be updated (inquiry 206) if the data block b1 does not include the requested values. Otherwise the method may end. The attribute value information may be updated to indicate additional information according to which the requested values are not included in the data block b1 such that, upon receiving a subsequent query, the updated attribute value information may be taken into account with respect to whether the data block b1 is selected for scanning.

In one example, step 207 may include two sub-steps. In a first sub-step of step 207, the query executor 161 may determine that none of the records of the data block b1 has the requested values of the received query and may thus save this information as a false positive report in the false positive report buffer 167. For example, a table may be created in the buffer 167 indicating the data block b1 and the requested values. In a second sub-step of step 207, the updater 163 may read the false positive report buffer 167 to determine that data block b1 does not include the requested values, and may thus update the attribute value information of data block b1 accordingly. The updater 163 may regularly (e.g. on a periodic basis) read the false positive report buffer 167. In another example, the updater 163 may be notified as soon as a new entry is added to the false positive report buffer 167. In response being notified, the updater 163 may read the false positive report buffer 167 to identify whether data blocks are associated with values that they don't include.

In another example, the query executor 161 may be configured in step 207 to perform the update of the attribute value information in response to determining that none of the records of the data block b1 include the requested values.

The update of the attribute value information may result in the data block b1 having multiple attribute value information with associated entries as described below.

Figure 3:
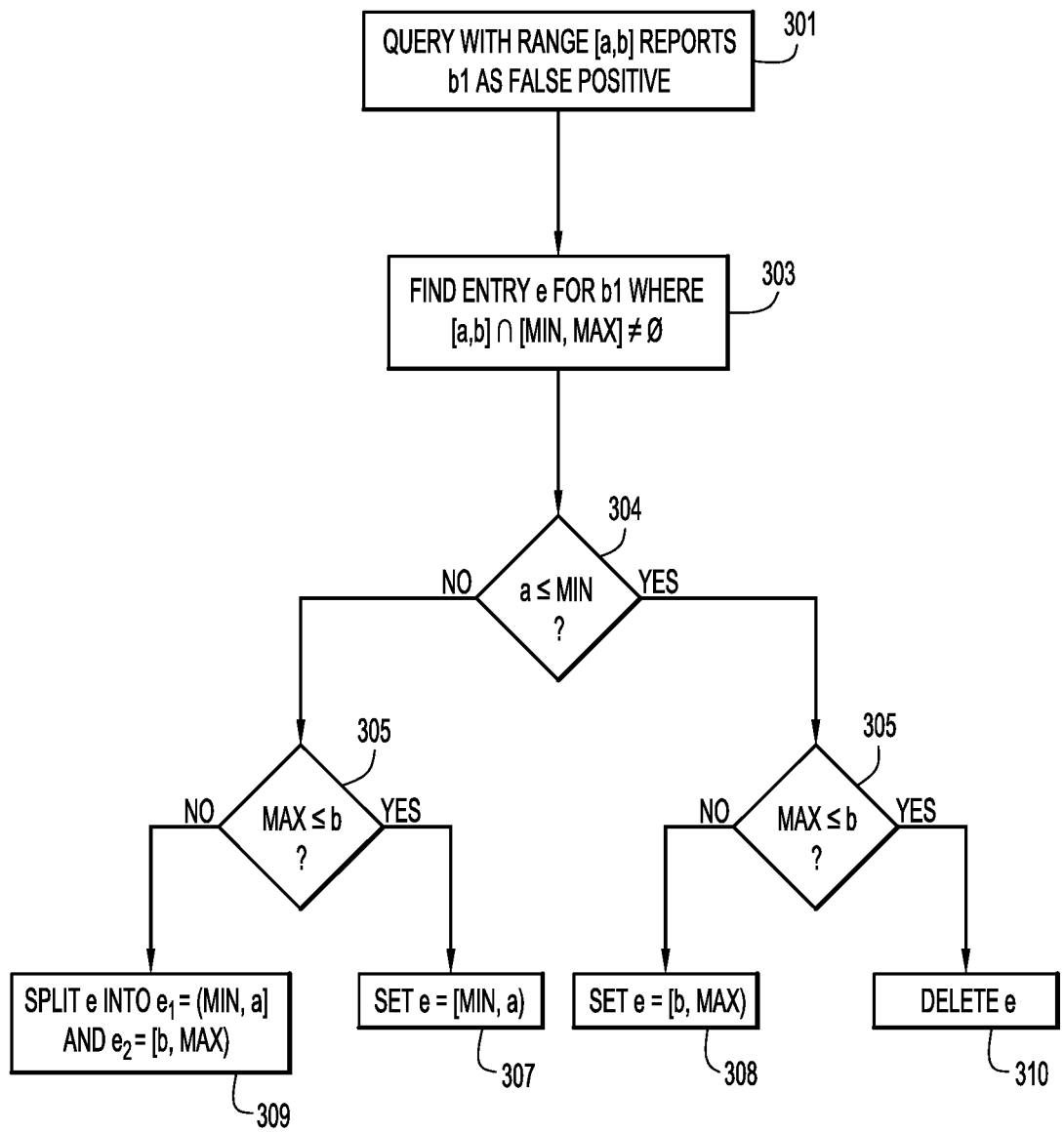
FIG. 3 describes a logical flow that is initiated when a point or range query against the data table is received.

FIG. 3 describes a logical flow that is initiated when a point or range query [a, b] (e.g. involving attribute 131B) has reported data block b1 as a false positive and the updater 163 processes the generated report.

In step 301, data block b1 is reported as a false positive because it does not satisfy a query range [a, b]. Data block b1 is selected for scanning because at least one entry of its one or more entries comprises attribute value information that overlaps the range [a, b]. However, data block b1 does not include any of the values of the range [a, b]. Query executor 161 may perform step 301. The attribute value information of data block b1 may be information initially or originally determined, e.g. at creation time of b1. In another example, the attribute value information of data block b1 may include the updated attribute value information that results from step 207.

In step 303, one or more entries may be determined for data block b1, e.g. by the updater 163. The one or more entries each include attribute value information (and associated range) of b1 which overlap the query range of [a, b]. Note that there can be more than one such entry, if the initial entry had been previously split, as described above.

Each entry e (e.g. having range [min, max]) of data block b1 which overlaps the query range [a, b] is considered further. If (inquiries 304-305) the query range only partly overlaps e, i.e., a≤min XOR max≤b, then only min (307) or max (308) is adjusted, so that entry e now covers [min, max]–[a, b].

If (inquiries 304-305) the query range lies fully within entry e, then a gap has been identified and entry e is replaced (309) by two new entries e1 and e2.

Finally, if e lies fully within the query range. This means that all values in the value range of e have been deleted from b1. Thus, e is obsolete so that the system deletes e (310). Note that this may or may not mean that b1 is empty, because other entries may exist for b1.

Figure 4:
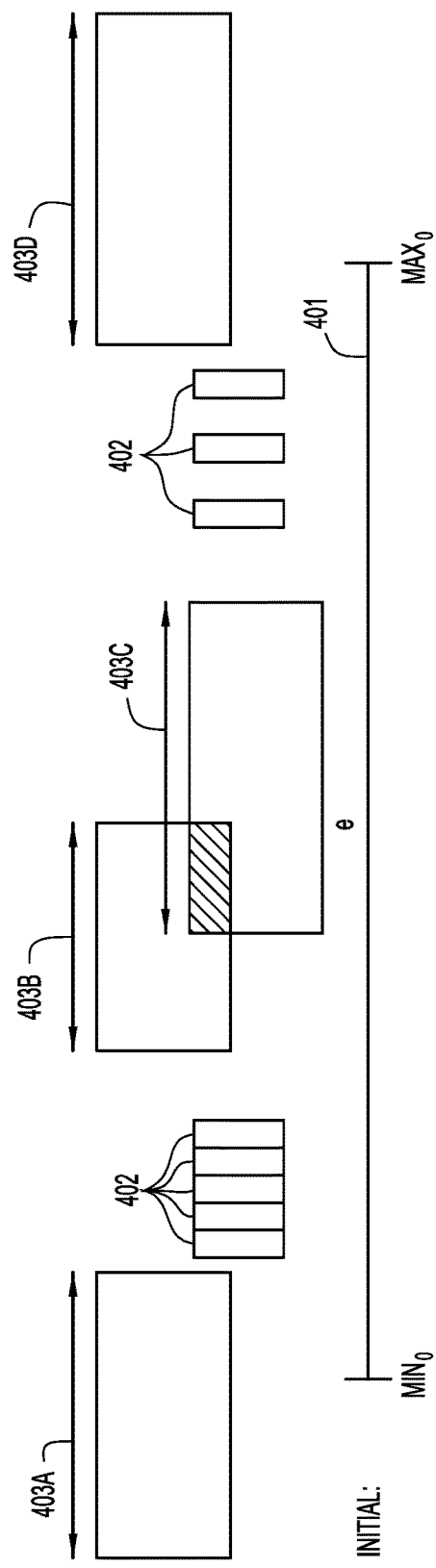
FIG. 4 illustrates a method for processing multiple range queries against the data table.
Figure 4:
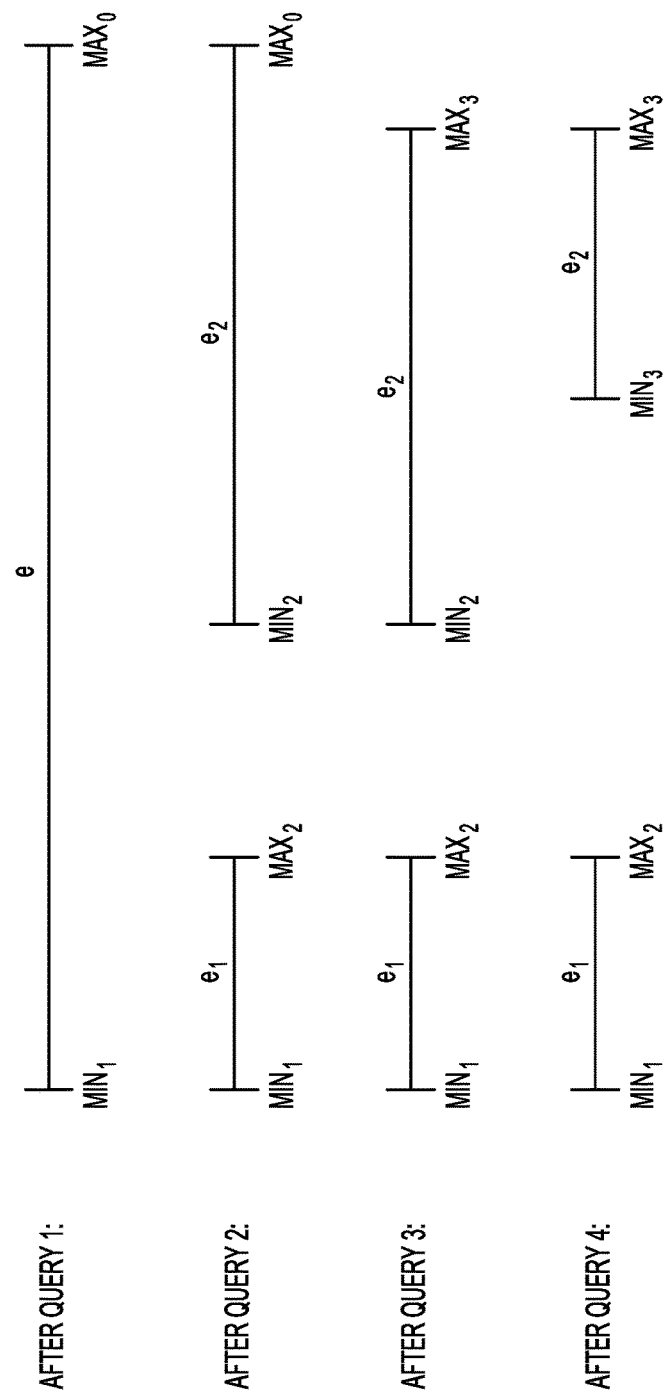

FIG. 4 illustrates a method for processing multiple range queries, query 1-4. Each of the queries 1-4 is requesting a respective range 403A-D of a value of the attribute e.g. 131B. The received queries 1-4 are against the data table 127. In the following, a description is provided for one data block 401 e.g. b1 of the data table 127 which may be repeated for other data blocks b2-bN of data table 127 in order to update entries associated with the data blocks b1-bN.

Initially the entry e may be far from optimal, because a number of deletes may have occurred in the data block b1 (as illustrated in FIG. 2). For example, at the time the attribute value information had been initially determined, the data block b1 had records including values of the attribute 131B that covered the range [min, max]. However, as illustrated in FIG. 4, only a few records 402 remain in the data block b1, which covers a range that is smaller than the initially determined range e [min0, max0].

The range 403A of query 1 overlaps with e, but reports data block 401 as a false positive. Because the query range starts below e, only the min value is adjusted, leading to range [min1, max0]. Note that the new min value, min1, is below a smallest value 402 that actually occurs in the data block b1 401. Scanning of the data block b1 may be avoided to find actual extremum values (e.g. min1 is the upper bound of the range 403A). Thus making use of the attribute value information, at no additional cost.

Query 2 has or requests a range 403B of values of the attribute 131B that lie entirely within the min/max range reported in e, even after the min value has been adjusted after query 1. Query 2 falls entirely into a gap in the value range of the data block b1 which leads to data block b1 being reported another time as a false positive. Thus, entry e may be replaced by two new entries e1 and e2 that both refer to the same data block b1. Again, real dimensions of the gap may not be needed. Only a gap range identified by query 2 may be used to create e1 and e2, which is in fact less than the actual gap to obtain the new ranges of [min1, max2] and [min2, max0] of e1 and e2 respectively, where min2 and max2 are the upper and lower bound of the range 403B respectively.

Query 3 only partly overlaps with e2 and thus only its max value max0 is adjusted to become max3.

The same holds for query 4, which technically only leads to an adjustment of the min value min2 of e2. However, conceptually, query 4 increases the identified gap in the original entry e.

With queries reporting gaps and introducing several entries per data block value distribution within the data block b1 can be approximated more accurately. Moreover, the approach is very cheap, because gaps are detected by queries. Apart from updating the attribute value information itself, no extra work may be required. Most notably, the data in the data blocks is left untouched.

Figure 5:
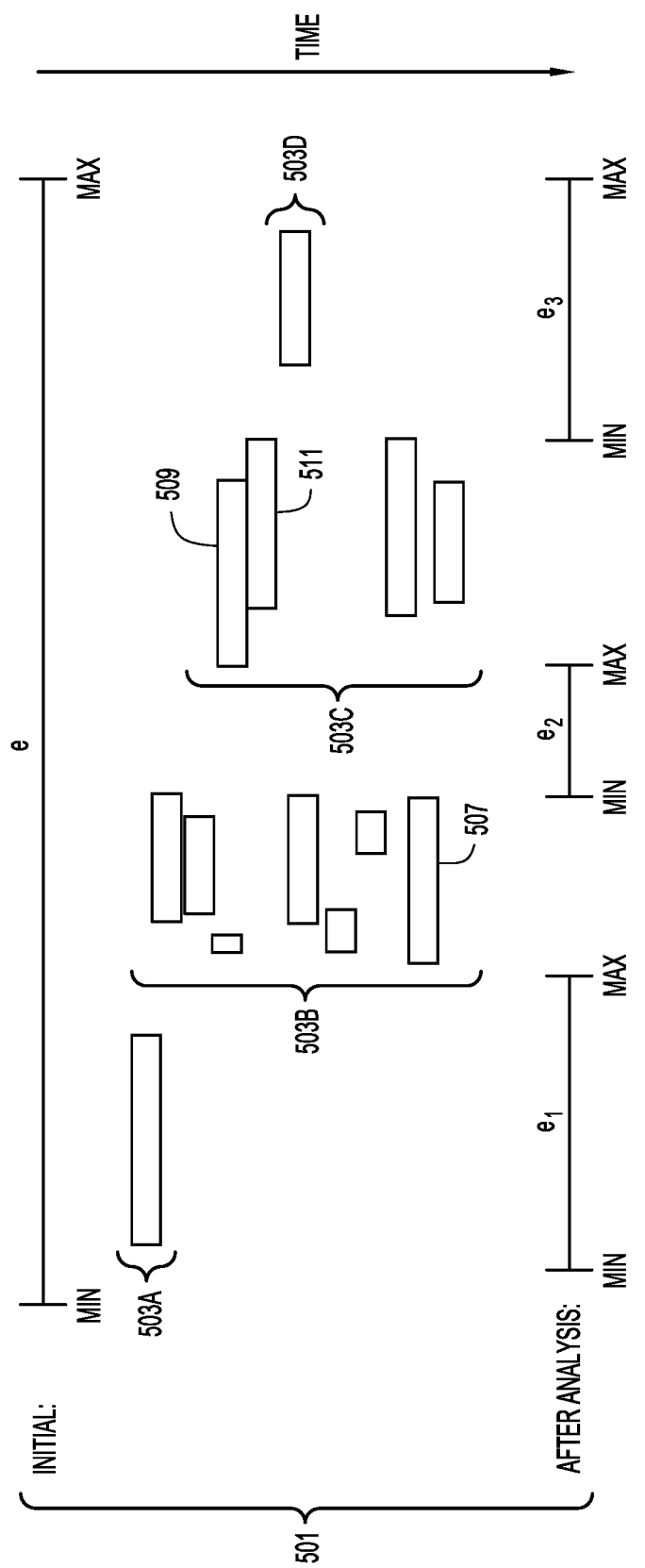
FIG. 5 illustrates another method for updating the attribute value information of a data block.

FIG. 5 illustrates another method for updating the attribute value information e.g. of data block b1. The attribute value information indicates a range [min, max] and is stored as an entry e. The present method may prevent too many entries by analyzing false positive reports over a time period 501.

An objective is to identify gaps that are responsible for a majority of the false positives and eliminate only those gaps. However, updating only one boundary of existing entries may still be done immediately (e.g. taking into account concurrency, as described herein), because this updating does not increase an amount of entries. The same holds for false positive reports identifying entries that are entirely empty; these identified entries are deleted immediately, too.

To analyze the reports, the false positive reports that identified gaps within value ranges are grouped by their data blocks. In a next step, clusters of gaps 503A-D are computed. The gaps (as illustrated by horizontal bars) that belong to a cluster may each indicate the range of values of the attribute e.g. 131B that has been requested by a received query and that have not been found in the data block b1. All gaps that overlap or seamlessly touch each other are assigned to the same cluster 503A-D. A number of reports that contribute to each cluster 503A-D is determined. Then only those clusters 503A-D with a highest number of contributing reports are considered for splitting the entries. Those clusters could either be a top k clusters (i.e., a fixed amount), all clusters with a hit rate above a given threshold, or clusters that fulfill any other metric that express a "split quality", e. g., by weighting the total number of entries per data block, their spatial extents over covered value ranges, hit ratio, etc. In the example of FIG. 5, clusters 503B-C are selected such that their associated ranges are extracted from the initial range [min, max] of entry e. This results in entries e1-3 with associated ranges.

For example, a largest gap that can be achieved by one or more gaps of a cluster may be excluded from the initial range [min, max]. For example, a largest gap of cluster 503B can be obtained by a single gap 507 which is extracted or excluded from the range [min, max]. In another example, a highest gap of cluster 503C may be obtained by combining gaps 509 and 511 and the combined gap is excluded from the range [min, max].

Workload Shifts

As queries and updates are processed over longer periods, it might be possible that a query workload shifts over time. This means that other queries are requested, that have different query ranges than previous queries. If these new query ranges are significantly different, they may be entirely contained in different holes. Time-related attributes are common examples for such situations. Current data might be loaded into a data warehouse or reports may change for a next quarter while older reports become less important for analytics. If attribute value information is to be optimized, the attribute value information is automatically adapted to a workload phase until the optimization terminates. After this termination point, e. g., after the maximum number of splits is reached, performance of the attribute value information may deteriorate if the query ranges shift from the query ranges used for updating the attribute value information. Such a situation would cause an increasing number of false positive hits for ranges that became "hot" due to the workload shift while other ranges that were recently "hot" and split accordingly are no longer hit by query predicates. Such hit rates and a "temperature" metric expressing a relevance of an entry for a current query workload can be used for monitoring and detecting workload shifts and can be handled by the system automatically. In one example, a reorganization that completely rebuilds attribute value information may be triggered. This triggering be done periodically without monitoring and detecting workload shifts. Such a workload-agnostic brute-force solution minimizes monitoring overhead during query execution. This approach may be applicable for systems that allow explicit data maintenance windows or allow these reorganizations to be carried out as asynchronous low-priority background tasks.

In another example, workload shifts may be monitored by implementing a mechanism such as the aforementioned hit rate and temperature-based algorithm, and solely adapting those entries that are relevant for the current workload. Such an approach automatically maintains entries without additional administration efforts, like scheduling maintenance windows, while minimizing changes by limiting reorganizations to workload-relevant sections of the data stored in the database.

One possible solution to detect a temperature of logical entries referring to a data block is to augment these entries with a counter representing a lifetime that is periodically decreased by an asynchronous maintenance job and is increased on a hit by a query. Once this counter reaches zero, the entry is merged with the neighboring entry of the same data block that causes a least increase in space covered by a resulting range. This process can be carried out until a single range remains that covers the entire data block which may lead to the original attribute value information layout without a workload optimization. The described process basically interprets entries that resulted from a split as a cache for the entire data block and implements a least frequently used strategy (LFU) as a replacement algorithm. But any other cache algorithm might be applied here, too. Note that such entry merges may be required if the query workload shifts within a data block and a maximum number of entries is reached for the data block. Merging such entries may lead to an optimization for unused data space by reducing the total number of entries within the data space and, hence, reduces attribute value information scan time for all queries.

But even with a remaining high number of entries per data block, this overhead should be very limited since a total number of entries is orders of magnitude lower than a number of tuples within the data blocks and such scans of entries can be accelerated using parallel processing hardware. So this small overhead may be negligible when considering a potential benefit for queries that might access parts of the data block in the future, e. g., queries from reports that are rarely executed and, thus, have less impact on the entire workload.

This adaptive solution approach may not require a scan of the underlying tuples as it operates solely on auxiliary attribute value information structures, which are by orders of magnitude smaller than the entire data set, and hence, have lower processing costs and are independent from concurrently running queries and updates if they are maintained, and therefore, can be modified asynchronously in small work units (e.g., one entry list at a time) without considering concurrency issues except latching to protect these auxiliary attribute value information structures from modifications by concurrent threads. Such properties may be beneficial for asynchronous maintenance tasks such as the updater that act transparently in the background without impacting concurrent workloads and will not involve an administration and/or tuning overheads or downtimes for executing maintenance jobs.

Inclusive and Exclusive Value Ranges

When a given entry or attribute value information is adjusted or replaced by two smaller entries, this may be achieved such that a requested query range is entirely subtracted from the min/max range of a given entry. Entries may typically be defined inclusively, i.e., min and max values themselves are part of the values that may occur in a data block. The system may have inclusive and exclusive query ranges (a query range can also be inclusive at one end and exclusive at the other end).

Exclusive Query Range

When the query range that led to a false positive is exclusive, as in the following example:

SELECT*FROM mytable WHERE mycolumn>50
    AND mycolumn<60

The query range does not include the boundary values (50 and 60), so that these can directly be used as an inclusive max or min value in updated attribute value information.

Inclusive Query Range

Inclusive query ranges leading to false positives may be as follows:

SELECT*FROM mytable WHERE mycolumn>=50
    AND mycolumn=<60

The query range includes the boundary values (50 and 60), so that it is known that these values do not occur in the data block. Thus, they may not be used in an inclusive min or max value in updated attribute value information. For discrete types, like integer types, a next lower or higher value may be used, i.e., 49 and 61 in the example. For example, if the first range is [20, 100], the updated attribute value information may comprise two second ranges [20, 49] and [61, 100]. For other data types (e. g., float or varchar), one solution is to augment each entry with indicators that report whether the extreme values are inclusive or exclusive. In another example, as long as an entry becomes more restrictive, it is still better to use the boundary values of the query compared to an existing entry, e.g. if a data type is float, the updated attribute value information may include two second ranges [20, 50] and [60, 100], although 50 and 60 are part of the requested query range. This may only have the effect that the very same query will produce a false positive again, but at least other queries with a more narrow query range may be able to skip the data block.

In another example, for data types (e. g., float or varchar), a next lower or higher value may be used, i.e., 50−epsilon and 60+epsilon where epsilon is the difference between 50 and the closest float number to 50 that can be encoded in the computer 101. For example, if the first range is [20, 100], the updated attribute value information may comprise two second ranges [20, 49.99999] and [60.99999, 100].

In another example a method for updating attribute value information for a data table in a database management system, where the data table has multiple records and involves at least a first attribute. The method includes: storing records of the data table on multiple data blocks; associating a piece of attribute value information with each data block, the attribute value information containing at least a min value representing a smallest value of the first attribute and a max value representing a largest value of the first attribute; scanning a first data block in connection with query processing and determining that the min value or the max value of the respective piece of attribute value information are not appropriately representing the values of the first attribute of records stored in the first data block; updating the piece of attribute information of the first data block based on the scan results.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A computer program product comprising one or more computer-readable storage media collectively having computer-readable program code embodied therewith, when the computer-readable program code is executed by at least one processing system, the at least one processing system is configured to: receive a range query against a data table including a plurality of data blocks, each respective data block of the plurality of data blocks including a plurality of records and involving at least a first attribute, stored attribute value information associated with the each respective data block including at least one range of values of the first attribute included in the respective data block, each range of values of the at least one range of values including a first value representing a smallest value of the first attribute for the range of values and a second value of the first attribute representing a largest value of the first attribute for the range of values, the received range query requesting values of the first attribute that are covered by the at least one range of values of at least one of the respective data blocks; use the stored attribute value information for selecting a data block of the plurality of data blocks of the data table as a candidate potentially comprising at least part of the requested values; scan the selected data block; and in response to determining that the selected data block does not have the requested values, update the attribute value information associated with the selected data block to indicate an absence of values of the first attribute corresponding to the requested values of the range query, the update comprising: find a range of values of the first attribute of the at least one range of values in the stored attribute value information for the selected data block covering at least part of a range of the range query, and change at least one of the first value and the second value of the found range of values to indicate that the found range of values excludes values covered by the range query, the change further comprising: responsive to determining that all of the requested values of the range query are greater than the smallest value of the found range of values and are less than the largest value of the found range of values, replace the found range of values of the first attribute with exactly two new ranges of values, each of which includes at least one respective value in the associated data block, and set first values and second values of the two new ranges of values to indicate coverage of a combined range equivalent to a range of the found range of values with a gap in a range identified by the range query, and responsive to determining that the found range of values is completely covered by the range query, delete the found range of values from the stored attribute value information; wherein the update of the stored attribute value information associated with the selected data block reduces an occurrence of false positives with respect to the selecting of the data block of the plurality of data blocks of the data table as the candidate.

2. A computer system comprising a processor and a memory for updating stored attribute value information associated with at least one data block of a plurality of data blocks of a data table, where each respective data block of the plurality of data blocks of the data table has a plurality of records and involves at least a first attribute, the stored attribute value information associated with the each respective data block including at least one range of values of the first attribute included in the respective data block, each range of values of the at least one range of values including a first value representing a smallest value of the first attribute for the range of values and a second value of the first attribute representing a largest value of the first attribute for the range of values, the computer system being configured for: receiving a range query against the data table requesting values of the first attribute that are covered by the at least one range of values for at least one of the respective data blocks; using the stored attribute value information for selecting a data block of the plurality of data blocks of the data table as a candidate potentially comprising at least part of the requested values; scanning the selected data block; and in response to determining that the selected data block does not have the requested values, updating the stored attribute value information associated with the selected data block to indicate an absence of values of the first attribute corresponding to the requested values of the range query, the updating comprising: finding a range of values of the first attribute of the at least one range of values in the stored attribute value information for the selected data block covering at least part of a range of the range query, and changing at least one of the first value and the second value of the found range of values to indicate that the found range of values excludes values covered by the range query, the changing further comprising: responsive to determining that all of the requested values of the range query are greater than the smallest value of the found range of values and are less than the largest value of the found range of values, replacing the found range of values of the first attribute with exactly two new ranges of values, each of which includes at least one respective value in the associated data block, and setting first values and second values of the two new ranges of values to indicate coverage of a combined range equivalent to a range of the found range of values with a gap in a range identified by the range query, and responsive to determining that the found range of values is completely covered by the range query, delete the found range of values from the stored attribute value information; wherein the updating of the stored attribute value information associated with the selected data block reduces an occurrence of false positives with respect to the selecting of the data block of the plurality of data blocks of the data table as the candidate.

3. The computer system of claim 2, further comprising a query executor and an updater, wherein:
the query executor is configured for determining that the selected data block does not include the one or more requested values and for saving a false positive report in a buffer of the computer system, the false positive report indicating the selected data block and the one or more requested values not included in the selected data block; and
the updater is configured for reading the buffer for the updating of the attribute value information associated with the selected data block.

4. The computer program product of claim 1, wherein when the computer-readable program code is executed by the at least one processing system, the at least one processing system is further configured to:
- receive a second query against the data table, the received second query being a point query;
- use the stored attribute value information for selecting a second data block of the plurality of data blocks of the data table as the candidate potentially comprising at least a requested value of the point query;
- scan the selected second data block; and
- in response to determining that the selected second data block does not have the requested value of the point query, the update of the attribute value information for the selected second data block comprises adding to the attribute value information for the selected second data block a list comprising the requested value for supporting query processing against the data table using both the at least one range of values and the list from the attribute value information for the selected second data block.

5. The computer program product of claim 1, wherein the updating of the attribute information for the selected data block is performed only if a number of ranges of values included in the at least one range of values of the first attribute included in the stored attribute value information for the selected data block is smaller than a predefined maximum number of ranges of values.

6. The computer program product of claim 1, wherein: the data table further involves a second attribute, the attribute value information for the each respective data block further including at least one range of values of the second attribute included in the respective data block, each range of values of the at least one range of values of the second attribute including a third value representing a smallest value of the second attribute for a respective the range of values of the at least one range of values of the second attribute of the respective data block and a fourth value representing a largest value of the second attribute for the range of values of the at least one range of values of the second attribute of the respective data block, and a fourth value representing a largest value of the second attribute for the range of values of the at least one range of values of the second attribute of the respective data block, the received query comprises a disjunction of two query predicates, a first query predicate requesting values of the first attribute and a second query predicate requesting values of the second attribute, and the updating of the attribute value information for the selected data block comprises updating value ranges of the first attribute and the second attribute.

7. The computer program product of claim 1, wherein when the selected data block does not have the requested values, the at least one processing system is further configured to: determine that at least one first database transaction involving an update/delete transaction with respect to the selected data block was started before a second database transaction that triggered the receiving of the range query, and wait until the at least one first database transaction completes before determining that the selected data block does not have the requested values.

8. The computer system of claim 2, wherein the computer system is further configured for:
- receiving a second query against the data table, the received second query being a point query;
- using the stored attribute value information for selecting a second data block of the plurality of data blocks of the data table as the candidate potentially comprising at least a requested value of the point query;
- scan the selected second data block; and
- in response to determining that the selected second data block does not have the requested value of the point query, the updating of the attribute value information for the selected second data block comprises adding to the attribute value information for the selected second data block a list comprising the requested value for supporting query processing against the data table using both the at least one range of values and the list from the attribute value information for the selected second data block.

9. The computer system of claim 2, wherein the updating of the attribute information for the selected data block is performed only if a number of ranges of values included in the at least one range of values of the first attribute included in the stored attribute value information for the selected data block is smaller than a predefined maximum number of ranges of values.

10. The computer system of claim 2, wherein: the data table further involves a second attribute, the attribute value information for the each respective data block further including at least one range of values of the second attribute included in the respective data block, each range of values of the at least one range of values of the second attribute including a third value representing a smallest value of the second attribute for the range of values of the at least one range of values of the second attribute of the respective data block and a fourth value representing a largest value of the second attribute for the range of values of the at least one range of values of the second attribute of the respective data block, the received query comprises a disjunction of two query predicates, a first query predicate requesting values of the first attribute and a second query predicate requesting values of the second attribute, and the updating of the attribute value information for the selected data block comprises updating value ranges of the first attribute and the second attribute.

11. The computer system of claim 2, wherein when the selected data block does not have the requested values, the computer system is further configured for: determining that at least one first database transaction involving an update/delete transaction with respect to the selected data block was started before a second database transaction that triggered the receiving of the range query, and waiting until the at least one first database transaction completes before determining that the selected data block does not have the requested values.

12. The computer program product of claim 1, wherein the update of the attribute value information is performed only in response to determining that the selected data block does not have the requested values a predetermined number of times.

13. The computer program product of claim 7, wherein the at least one processing system is further configured to: determine that the selected data block does not have one or more other requested values of a second query while waiting until the at least one first database transaction completes; and after the at least one first database transaction completes, use a combination of the requested values and the one or more other requested values to perform a single update of the attribute value information of the selected data block.

14. The computer system of claim 2, wherein the updating of the attribute value information is performed only in response to determining that the selected data block does not have the requested values a predetermined number of times.

15. The computer system of claim 11, wherein the computer system is further configured for: determining that the selected data block does not have one or more other requested values of a second query while waiting until the at least one first database transaction completes; and after the at least one first database transaction completes, using a combination of the requested values and the one or more other requested values to perform a single update of the attribute value information of the selected data block.

\* \* \* \* \*